May 16, 1933.　　　　E. C. THOMPSON　　　　1,909,597
PHOTOGRAPHIC SHUTTER AND CONTROLLING MECHANISM
Filed April 27, 1932
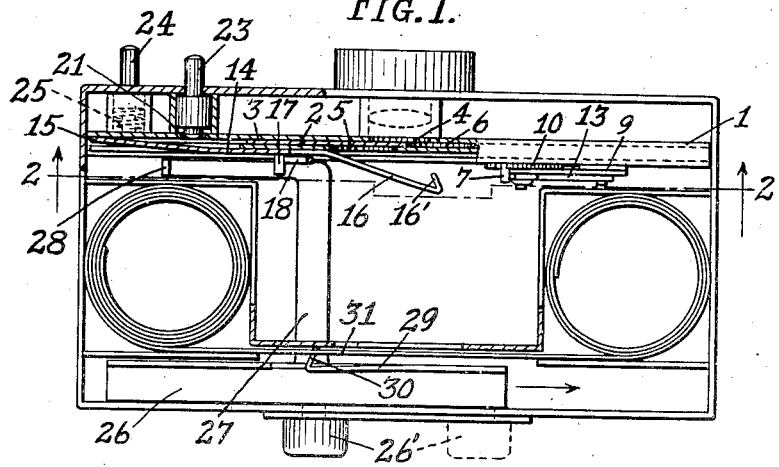
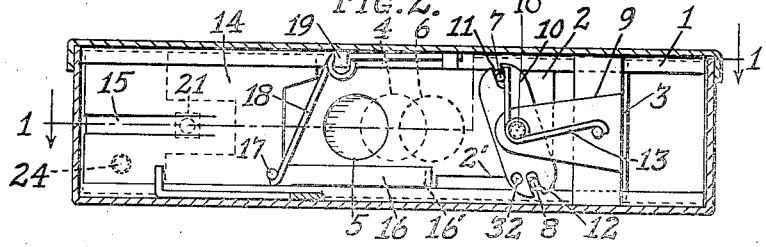
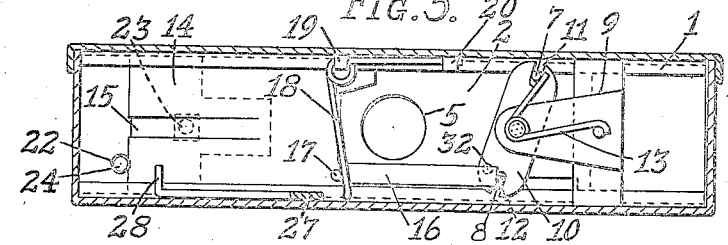
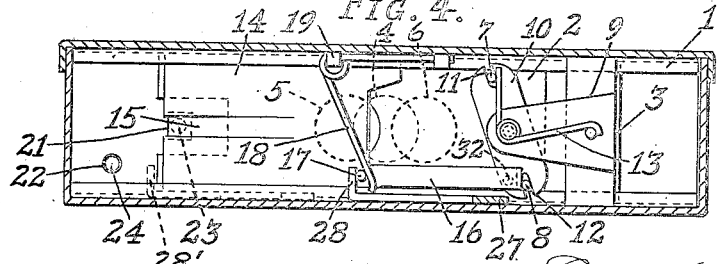
INVENTOR,
Eugene C. Thompson Patented May 16, 1933

1,909,597

UNITED STATES PATENT OFFICE

EUGENE C. THOMPSON, OF LOS ANGELES, CALIFORNIA

PHOTOGRAPHIC SHUTTER AND CONTROLLING MECHANISM

Application filed April 27, 1932. Serial No. 607,773.

The primary object of my invention is to provide a photographic shutter and controlling mechanism therefor suitable for use in cameras of the miniature type, and which are very narrow by comparison with the length.

A further object is to provide a shutter adapted to be placed in operating position by the shifting of the film strip to new exposure position, and to render it impossible to again operate the shutter until it has again been set by another movement of the film-shifting member.

Other objects and advantages will appear hereinafter, and while I show herewith and will describe a preferred form of construction, I desire it to be understood that I do not confine my invention to such preferred form, but that various changes and adaptations may be made therein without departing from the spirit of my invention as hereinafter claimed.

Referring to the drawing which accompanies this specification and forms a part thereof:—

Fig. 1 is an enlarged plan of a camera of the type contemplated, having its cover removed and the shutter blades and supporting guide associated therewith shown partly in section on line 1—1 of Fig. 2, parts of its front wall and middle partition also being shown broken away and in section.

Fig. 2 is a sectional view of the camera shown in Fig. 1, with cover complete, taken on line 2—2 of that figure and showing the positions of the shutter blades and their operating mechanism before having been set for making an exposure.

Fig. 3 is a sectional view similar to Fig. 2, showing the shutter blades and operating mechanism in position for a time exposure.

Fig. 4 is a similar view showing the positions of the shutter blades and their operating mechanism when set for an instantaneous exposure.

Referring particularly to the construction of my shutter, I provide a supporting clip, 1, (Fig. 1) carrying two longitudinally-sliding thin shutter blades, 2 and 3, the clip and shutter blades 2 and 3 being perforated to form apertures 4, 5 and 6 respectively (Fig. 2), which correspond in size to the full lens aperture. Shutter blade 2 is provided with a small pin, 7, the shutter blade 3 is provided with a similar pin, 8, which projects through a slot 2' in shutter blade 2. A cross plate, 9, mounted on the clip, 1, carries a pivoted rocker bar, 10, this rocker bar being slotted at 11 and 12 for engagement with the shutter-blade pins 7 and 8, respectively. A spring, 13, adapted to actuate rocker bar 10 is mounted on the rocker-bar pivot-pin 10'. A tripping plate, 14, slidable in supporting clip 1 carries a detent spring, 15, a resilient tongue, 16, which terminates in a hook, 16', and a pin, 17. A spring, 18, supported on the clip 1 at 19 and 20 engages with the pin 17 so as normally to hold the tripping plate, 14, in the position shown in Figs. 1 and 2.

The supporting clip, 1, is also perforated at 21 and 22 as shown in the same figures. Detent spring, 15, is adapted to engage aperture 21 so that it may be released by a trigger, 23, and a detent pin, 24, is operable through aperture 22 against the action of a spring, 25.

A film-shifting member, 26, (Fig. 1) carries an arm, 27, with a hooked end, 28. This is the shutter-setting member. It also carries a pair of springs, 29, with hooked ends, 30, adapted to engage apertures in the film, 31.

Operation.—The film is shifted to a new exposure position by the movement of the film shifting member, 26, by its knob, 26', to the limit of its travel. It is then returned to its original position. In this movement the arm, 27, by its hooked end, 28, engages the pin, 17, of the tripping plate, 14, and as the arm reaches the limit of its movement the hook, 16', engages the pin, 32, of the rocker bar, 10, and the detent spring, 15, of the tripping plate 14 engages the aperture, 21, in the supporting clip 1, the setting arm, 27, being returned to the dotted line position 28' (Fig. 4). The shutter is now set for operation. To operate the shutter the trigger, 23, is depressed very slightly, disengaging the end of the spring, 15, from the edge of aperture 21, and the tripping plate, actuated by the spring 18, returns to its normal position, its hook, 16', carrying with it the pin 32 of rocker bar 10, against the tension of the rocker-bar spring, 13, the pin, 32, disengaging from the hook 16' as the tripping plate 14 approaches the limit of its movement, the rocker bar, 10, through its engagement with the shutter blade pins 7 and 8 having moved the two shutter blades in opposite directions, the apertures 4, 5 and 6 in the supporting clip being momentarily in line and the shutter fully open, as in Fig. 3. Where it is desired to give a longer exposure the detent, 24, is pressed by one finger, and the trigger 23 by another finger, the small end of the detent pin, 24, protruding through the clip plate aperture 22 and stopping the tripping plate 14 in the position, Fig. 3. On releasing the pressure on the detent 24 it is returned to normal position by its spring, 25, and the tripping plate, 14, continues to its normal position, Fig. 2.

In the interest of simplicity no effort has been made in this drawing to include minor refinements and "fool-proof" features.

I claim as my invention:

1. In a camera the combination of reciprocally acting shutter blades, a suitably supported rocker bar, operative connection between the rocker bar and shutter blades, a spring actuated tripping member adapted to engage the rocker bar and move it on its axis, means for holding the tripping member in tensional position, consisting of a resilient member adapted to engage a stop, and a trigger for disengaging the resilient member from the stop.

2. The shutter mechanism claimed in claim 1, and a film-shifting member carrying an arm adapted to engage the tripping member and move it into tensional position.

3. The shutter mechanism claimed in claim 1, and a manually controlled detent, adapted to check the tripping member, rocker bar and shutter leaves in intermediate position.

4. In a camera the combination of reciprocally acting shutter blades, a shutter-blade operating member, a sliding film-shifting member, and operative connection between the film shifting member and the shutter-blade operating member, by which the shutter-blade operating member is placed in operative position by the operation of the film shifting member.

EUGENE C. THOMPSON.